United States Patent
Lappe

(10) Patent No.: US 10,093,059 B2
(45) Date of Patent: Oct. 9, 2018

(54) APPARATUS FOR THE HEATING OF PLASTICS MATERIAL PRE-FORMS WITH AERATION SCREENING CAPABLE OF BEING DISMANTLED

(71) Applicant: Krones AG, Neutraubling (DE)

(72) Inventor: Ulrich Lappe, Neutraubling (DE)

(73) Assignee: Krones AG, Neutraubling (DE)

( * ) Notice: Subject to any disclaimer, the term of this patent is extended or adjusted under 35 U.S.C. 154(b) by 1085 days.

(21) Appl. No.: 14/100,073

(22) Filed: Dec. 9, 2013

(65) Prior Publication Data

US 2014/0197581 A1    Jul. 17, 2014

(30) Foreign Application Priority Data

Jan. 15, 2013 (DE) .................. 10 2013 100 390

(51) Int. Cl.
| | |
|---|---|
| B29C 49/64 | (2006.01) |
| B29C 49/68 | (2006.01) |
| B29C 49/06 | (2006.01) |

(52) U.S. Cl.
CPC .......... B29C 49/64 (2013.01); B29C 49/6418 (2013.01); B29C 49/68 (2013.01); *B29C 49/06* (2013.01)

(58) Field of Classification Search
CPC ..... B29C 49/64; B29C 49/68; B29C 49/6418; B29C 49/06
See application file for complete search history.

(56) References Cited

U.S. PATENT DOCUMENTS

| | | | |
|---|---|---|---|
| 7,448,866 B2 | 11/2008 | Doudement | |
| 8,983,281 B2 * | 3/2015 | Schoenberger | ....... B29B 13/024 |
| | | | 392/407 |
| 2009/0317506 A1 * | 12/2009 | Adriansens | ............... A61L 2/04 |
| | | | 425/103 |
| 2010/0007061 A1 | 1/2010 | Feuilloley et al. | |

FOREIGN PATENT DOCUMENTS

| | | |
|---|---|---|
| CN | 102233667 A | 11/2011 |
| DE | 102010018214 A1 | 10/2011 |
| EP | 0564354 A1 | 10/1993 |
| FR | 2863931 A1 | 6/2005 |
| WO | 10/49075 A1 | 7/2001 |

OTHER PUBLICATIONS

Chinese Office Action in Chinese Application No. 201310687879.7 dated Sep. 1, 2016.
Chinese Office Action in Chinese Application No. 201310687879.7 dated Sep. 2, 2015.
European Search Report, EP14150962, dated Apr. 30, 2014, 5 pgs.

* cited by examiner

*Primary Examiner* — Joseph S Del Sole
*Assistant Examiner* — John Robitaille
(74) *Attorney, Agent, or Firm* — Oppedahl Patent Law Firm LLC

(57) ABSTRACT

An apparatus (1) for the heating of plastics material pre-forms (10) with a conveying device (2) which conveys the plastics material pre-forms (10) along a pre-set conveying path (T), with at least one heating element (4) which is arranged along the conveying path (P) of the plastics material pre-forms (10) and which heats the plastics material pre-forms (10), wherein in addition a cooling device is provided which cools the plastics material pre-forms (10) and/or at least one element of the apparatus (1) during the heating of the plastics material pre-forms (10) by acting upon them with a gaseous medium.

13 Claims, 1 Drawing Sheet

APPARATUS FOR THE HEATING OF PLASTICS MATERIAL PRE-FORMS WITH AERATION SCREENING CAPABLE OF BEING DISMANTLED

BACKGROUND

The present invention relates to an apparatus for the heating of plastics material pre-forms. Apparatuses of this type have long been known from the prior art. In the beverage producing industry it has become customary to produce plastic bottles, in which case plastics material pre-forms pass through a furnace, in particular an infrared furnace, for this purpose and are then shaped in this heated state in a following blow moulding machine, in particular a stretch blow moulding machine, by being acted upon with blow moulding air to form the plastics material containers. In this case furnaces of this type have to heat the respective plastics material pre-forms very exactly and to a precisely defined temperature.

In addition, it is known in this case for infrared radiators to heat the plastics material pre-forms and for the radiation to be reflected in this case by back reflectors as well as also by counter reflectors which are situated on the side of the infrared radiators arranged opposite in each case with respect to the conveying path of the plastics material pre-forms. Reflectors of this type consist in this case of ceramic material for example. It is also possible in this case for a diffuse multiple reflection to occur between these reflectors described. The long-wave portions of the infrared radiation, however, can penetrate in this case only to a poor degree into the material of the plastics material pre-forms, for example PET. This means that the surface of the plastics material pre-forms heats up more quickly than the planes of material situated at a lower level. In particular, in the case of plastics material pre-forms with a higher material strength this can lead to the surfaces thereof being excessively heated by the long-wave portions of radiation, whereas the lower-lying areas of the plastics material pre-forms are not sufficiently heated. In order therefore to be able to heat the lower-lying areas of the plastics material pre-forms sufficiently, whilst at the same time preventing the outer surface of the pre-forms from overheating and from the crystallization associated with the latter, it is known from the prior art of the Applicants to cool during the heating process.

In addition, it is known at least from the internal prior art of the Applicants for use to be made of a surface cooling of the plastics material pre-forms which will prevent the surface of the plastics material pre-forms from overheating in such a way that a so-called thermal crystallization takes place on the plastics material pre-forms. This surface cooling of the plastics material pre-forms has the drawback, however, that more air is frequently blown onto the plastics material pre-forms than is in fact required to counteract the above effect. This, however, adversely affects the energy efficiency of the furnace since it is heated and cooled at the same time.

Investigations of the Applicants have shown that highly significant energy savings can be achieved by omitting this surface cooling in the case of certain pre-forms. If, however, this cooling is dispensed with, i.e. if no air flow occurs in the furnace, the latter gradually continues to heat up. This means that on the one hand problems occur with the materials, such as for example damage as a result of excessive temperature, and on the other hand the process stability can no longer be maintained since the heating inside the furnace or respectively the internal state thereof is permanently changed.

The object of the present invention is therefore to make available an apparatus and a method of heating plastics material pre-forms, which are capable of being applied to different types of pre-forms and which nevertheless permit a uniform heating of plastics material pre-forms in every case. A further object of the invention is to increase the energy efficiency of a blow moulding machine, in particular the heating apparatus thereof. These objects are attained according to the invention by the subjects of the independent claims.

SUMMARY OF THE INVENTION

An apparatus according to the invention for the heating of plastics material pre-forms has a conveying device which conveys the plastics material pre-forms along a pre-set conveying path. In addition, the apparatus has at least one heating element which is arranged along the conveying path of the plastics material pre-forms and which heats the plastics material pre-forms. In addition, the apparatus has a cooling device which cools in a convective manner the plastics material pre-forms and/or at least one element or respectively a region of the apparatus during the heating of the plastics material pre-forms by acting upon them with a gaseous medium.

According to the invention the flow path of this gaseous medium is capable of being changed in such a way that in a first pre-set manner it is capable of being conveyed (during the heating of the plastics material pre-forms) with respect to the outer surface of the plastics material pre-forms to be heated or respectively to an outer surface of the plastics material pre-forms to be heated and in a second pre-set manner, which differs from the first pre-set manner, it is likewise capable of being conveyed with respect to the outer surface of the plastics material pre-forms, in which case the first and second pre-set manners differ at least with respect to the volume flow arriving at the outer surface. In this case it is possible, for example, for the air flow to the pre-form to be prevented substantially completely by the attachment of the intermediate plate.

It is therefore proposed according to the invention that the gaseous medium which is provided for cooling and which is in particular air or respectively the flow thereof should be capable of being changed in such a way that smaller or larger volume portions of this gaseous medium can be directed onto the outer surface of the plastics material pre-forms. It is advantageous in this case for a change to be possible in such a way that in at least one state the encounter of gas or air respectively with the outer surface of the plastics material pre-forms can be prevented substantially completely. It is preferable for the heating elements to be infrared heating elements which, in particular, can be arranged along a conveying path of the plastics material pre-forms. Use would also be possible, however, on different types of furnaces, such as in particular on so-called STIR (selective transformed infrared) furnaces.

In addition, it is advantageous for the conveying device to be designed in such a way that the plastics material pre-forms are conveyed at least locally along a straight conveying path. It is advantageous for two straight portions of this type to be provided, between which a reversal preferably by 180° can in turn take place. In this way, these two straight portions of the conveying path are advantageously arranged parallel to each other.

It is advantageous for the conveying device to convey the plastics material pre-forms separately. It is preferable for the conveying device to convey the individual plastics material pre-forms at a slight distance from one another. It is advantageous in this case for a rotation device also to be provided which turns the plastics material pre-forms about the longitudinal axis thereof during the conveying and during the heating thereof. In this case it is possible for a separate drive, such as for example a servo motor, to be associated with each individual plastics material pre-form. It would also be possible, however, a unitary rotational device, such as for example a toothed wheel drive or a toothed belt drive respectively, to be provided. It is preferred for the conveying device to have a circulating conveying chain, on which a plurality of holding devices for holding the plastics material pre-forms are arranged.

In the case of a further advantageous embodiment the apparatus has a plurality of holding or respectively gripping devices for holding the individual plastics material pre-forms. It is advantageous for these to be holding mandrels which are introduced into the apertures of the plastics material pre-forms.

In the case of a further advantageous embodiment the apparatus has a flow guide element which is used for guiding the aforesaid gas flow. As a result of a relative movement of this flow guide element with respect to the conveying path of the plastics material pre-forms a change-over between the one pre-set manner and the second pre-set manner is possible. This means that the arrangement of the flow guide element, for example in a position in which a complete removal of this flow guide element can also be involved, causes the gaseous medium to arrive at the plastics material pre-forms, and in another position (in particular as a result of the insertion of the flow guide element at least in part) a diversion of the gaseous medium past the plastics material pre-forms at least in part is carried out.

In this way, in the case of this embodiment it is advantageous for a fitting part to be made available which is introduced into a region of the furnace, for example is positioned in front of a reflector element, in particular a reflector element which is arranged on the opposite side with respect to the heating elements as viewed from the plastics material pre-forms. In other words the plastics material pre-forms are conveyed in this case between the heating elements and the flow guide element. In this case it is also possible for a suspension device to be provided, by means of which the flow guide element can be suspended in the furnace.

In this way, the gas flow, in particular the air flow, onto the individual plastics material pre-forms is prevented at least in part and preferably completely. In this case it is possible for this fitting part, and in particular also the rear side thereof, to have a hollow space which is open in one direction, and in particular downwards, but which is otherwise closed, or respectively to form this hollow space with a further element, for example a reflector. This hollow space can be used to divert downwards the air flowing out of the reflectors, i.e. around the plastics material pre-form. In this way, air also continues to flow through the furnace, and this results in constant conditions. At the same time the plastics material pre-forms are no longer cooled on their surface. This procedure is advantageous, in particular when thin-walled plastics material pre-forms are to be heated, since in this case the long-wave radiation is sufficient to heat the pre-form throughout.

If use is made of plastics material pre-forms with thicker walls, however, the aforesaid flow guide devices or fitting parts can be removed and the surface cooling is used again in order to cool the very thick-walled plastics material pre-forms on their surface and thus to prevent the crystallization of the surface of the pre-forms. In this way, it is possible for these flow guide elements to be fitted or dismantled depending upon the requirements. In the case of plastics material pre-forms with very thin walls it would also be possible to shut off the heating channel completely. In this way, it is advantageous for the heating device to have a heating channel or warming channel respectively through which the plastics material pre-forms are conveyed during the heating thereof.

In this case it is also possible for an underside of this heating channel to be completely closed. In this case a width of these flow guide elements can also depend upon the width of the heating channel. In this way, an optimum use of the heating energy is made possible, even in the case of plastics material pre-forms with very thin walls, in particular in the case of those plastics material pre-forms with thin walls in which no surface cooling or only slight surface cooling is required. In this way, an optimization of energy is made possible. In addition, it is additionally possible to heat plastics material pre-forms with relatively thick walls. In addition, it is also possible for a furnace with a stable process to be maintained, since the latter is traversed uniformly by air as before.

In addition, it is also possible for a flow guide element of this type to be fitted on already existing heating devices or respectively to be retrofitted in each case if other plastics material pre-forms are to be heated. In addition, a rapid conversion is also possible.

In this way, the present invention further relates to a flow guide element which can be arranged in an apparatus for the heating of plastics material pre-forms in such a way that this flow guide element substantially completely prevents plastics material pre-forms from being acted upon with air on the outer surface thereof. In this case it is possible for this flow guide device to be suspended or respectively arranged in the heating channel of an apparatus of this type for the heating of plastics material pre-forms.

It is advantageous for this flow guide element also to extend at least in sections in the conveying direction of the plastics material pre-forms. In particular, the flow guide element can extend over an entire heating module in the conveying direction of the plastics material pre-forms. It is advantageous for this flow guide element to extend at least along the complete longitudinal extension of the plastics material pre-forms, but preferably with the exception of the threads thereof. In the case of a further advantageous embodiment the apparatus has a screening element in order to screen off a thread area of the plastics material pre-forms during the heating. In this case it is pointed out that during the heating of plastics material pre-forms of this type the thread area is usually omitted, since the latter is already in its final shape and is no longer expanded in the following stretch blow moulding procedure. In this case it is possible for a heating device to be formed from a plurality of heating modules which are arranged in particular one behind the other along the conveying path of the plastics material pre-forms. In this case these heating modules can have different or the same lengths. In addition, it is possible for the individual heating devices to be capable of being controlled independently of one another and/or to be capable of being switched on and respectively off independently of one another.

It is advantageous for the flow guide device to be designed in the form of a screening plate.

In the case of a further advantageous embodiment the heating elements are arranged only on one side with respect to the conveying path of the plastics material pre-forms. This means that the plastics material pre-forms are actively heated by the heating elements on only one side and the reactor element mentioned above is preferably arranged on the opposite side. In particular, on account of the rotation of the plastics material pre-forms as described above, a uniform heating of the plastics material pre-forms can likewise be achieved in the peripheral direction thereof over the entire conveying path.

In the case of a further advantageous embodiment the apparatus has a heating channel through which the plastics material pre-forms are conveyed during the heating thereof. In this way, it is advantageous for this heating channel to extend along the complete conveying path of the plastics material pre-forms through the heating device. In this way, it is preferable for the heating apparatus to have heating elements which actively heat the plastics material pre-forms, and the flow guide element is arranged in such a way that the plastics material pre-forms are conveyed at least in sections between these heating elements and the flow guide element.

In the case of a further advantageous embodiment the apparatus has a first reflector element and the plastics material pre-forms are conveyed between the heating elements and this first reflector element. This means that the heating channel mentioned above is also defined by the position of the heating elements and the reflector elements opposite them with respect to the conveying path of the plastics material pre-forms.

It is advantageous for at least the first reflector element to be cooled by the gaseous medium.

In the case of a further advantageous embodiment the apparatus has a plurality of second reflector elements which are arranged on the same side as the heating elements with respect to the conveying path. These reflector elements have the effect that as much as possible of the heat radiation emitted by the heating elements reaches the plastics material pre-forms as effectively as possible.

It is advantageous for the flow guide device or the flow guide element respectively to be designed in such a way that, independently of its position, part of the cooling gas at least also reaches a surface of the reflector elements. As mentioned, the flow guide device can preferably be an intermediate plate which, in particular, can be suspended in the conveying channel of the plastics material pre-forms. It is preferable for the flow guide element also to be designed in such a way that a setting or respectively a change of the distance of the flow guide element from the plastics material pre-form or respectively of the flow guide element and the reflectors (in particular the counter reflectors on the opposite side of the back reflectors) can be achieved.

In the case of a further advantageous embodiment at least one reflector element has ceramic tiles.

In the case of a further advantageous embodiment the flow guide element is formed on at least one surface, and in particular on a surface facing the plastics material pre-forms and also the heating elements, in such a way that it reflects infrared light with a wavelength of more than 900 nm by at least 20%, preferably by at least 40%, and preferably by at least 60%. It is advantageous for these to be wavelengths in a range of more than 1000 nm, and preferably of more than 1200 nm. In this context it is pointed out that, as mentioned above, the flow guide element is inserted or suspended respectively in the heating channel. A large part of the face of this flow guide element is thus situated in front of the aforesaid reflector element. In this way, it would be expedient for the flow guide element also to fulfil the function of the reflector element at least in part. It is advantageous, however, for an area of the flow guide element also to be acted upon by the cooling gas and, in particular, this is a surface facing away on the rear side from the surface mentioned here. It is preferable for the flow guide element to have, on the surface facing the plastics material pre-forms, a coating 18a which has the above reflecting properties with respect to infrared radiation.

In the case of a further advantageous embodiment the gaseous medium passes through a cross-sectional area of at least one reflector element, and in particular through a cross-sectional area of the counter reflector element, which is arranged on the opposite side of the conveying path of the plastics material pre-forms with respect to the heating elements. In this way for example, a plurality of openings or bores respectively, through which the aforesaid cooling gas can pass, can be arranged in the counter reflector element. In this way, it is advantageous for the cooling gas to have at least one direction of flow or in one direction respectively a portion which extends at a right angle to a conveying direction of the plastics material pre-forms and/or at a right angle to a longitudinal direction of the plastics material pre-forms.

In this way, it would be possible for a channel for guiding the gaseous medium to be provided in the aforesaid reflector element. In addition, however, it is preferable for a plurality of channels of this type to be provided, so that a uniform cooling of the reflector element is achieved. On account of the provision of a plurality of channels of this type a uniform cooling of the surface of the pre-forms can also be achieved in the absence of the flow guide element.

The present invention further relates to a method of heating plastics material pre-forms. In this case the plastics material pre-forms are conveyed by a conveying device along a pre-set conveying path and are heated by at least one heating element which is arranged along the conveying path of the plastics material pre-forms. In addition, a cooling device is provided which cools the plastics material pre-forms and/or at least one element of the apparatus by acting upon them or it with a gaseous medium during the heating of plastics material pre-forms.

According to the invention a flow path of the gaseous medium is changed in such a way that it is guided in a first pre-set manner with respect to the outer surface of the plastics material pre-forms during the heating thereof and (as a result of the change) it is guided in a second pre-set manner—which is different from the first pre-set manner—with respect to the outer surface of the plastics material pre-forms, the first pre-set manner and the second pre-set manner differing at least with respect to the volume flow which reaches the outer surface of the plastics material pre-forms or the quantity of the cooling medium respectively.

It is therefore also proposed with respect to the method that a change in the flow paths of the gaseous medium, in particular in the interior of the heating apparatus or the heating channel respectively, should be possible in such a way that the volume or the quantity respectively of the medium reaching the outer surface of the plastics material pre-forms can be changed. It is advantageous for a change of this type between the first and the second pre-set manner to be changed in a manner dependent upon the plastics material pre-forms to be heated, and in particular in a manner dependent upon a wall thickness of these plastics material pre-forms.

It is advantageous for the gaseous medium also to be conveyed past the plastics material pre-forms in a longitudinal direction of the latter in a pre-set manner.

In the case of a further advantageous method a flow guide element is moved or respectively displaced relative to the conveying path of the plastics material pre-forms. In particular, a flow guide element of this type is introduced into the apparatus or into a heating channel of the apparatus respectively in order to change over from one manner to the other. It is preferred for the flow guide element either to be fitted into a heating channel of the plastics material pre-forms or to be dismantled from the latter for the change-over.

DETAILED DESCRIPTION

Figure 1:
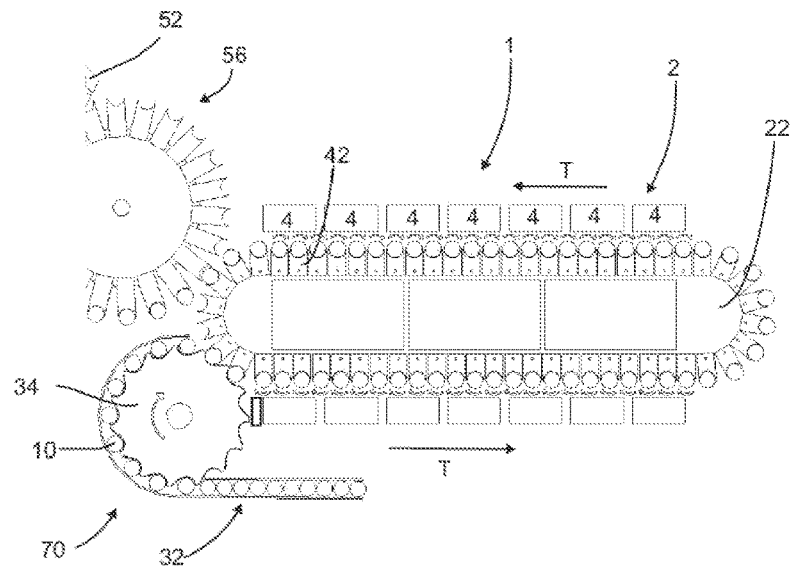
FIG. 1 is a diagrammatic illustration of an arrangement according to the invention for the production of plastics material containers with a heating apparatus according to the invention.

FIG. 1 shows a view of a plant 70 for the production of plastics material containers. In this case a supply device 32 is first provided which supplies plastics material pre-forms 10 to a heating apparatus 1 according to the invention. The reference number 34 designates in this case a separating apparatus, such as for example a single-step star wheel, the external periphery of which has a plurality of recesses which guide the plastics material pre-forms 10 separately in each case. The apparatus 1 according to the invention has a conveying device which is designated 2 as a whole and which guides the plastics material pre-forms along their conveying path T.

A plurality of heating devices 4 are arranged in series one behind the other in each case on the external periphery of this conveying path. The reference number 42 designates a holding element which is used for holding the individual plastics material pre-forms. As indicated by the small arrows, the plastics material pre-forms are turned in this case about their longitudinal direction in addition to their movement along the conveying path T. The reference number 22 designates diagrammatically a reversing wheel, in the region of which the conveying movement of the plastics material pre-forms is reversed by 180° and they are then guided back again.

The reference number 56 designates a transfer wheel which takes on the now heated plastics material pre-forms and transfers them to a shaping device (not shown) arranged downstream for shaping plastics material pre-forms into plastics material containers. This apparatus for shaping plastics material pre-forms into plastics material containers is preferably a stretch blow moulding machine which has a plurality of shaping stations 52 (recognizable only in part) arranged on a movable, and in particular on a rotatable, carrier. These shaping stations in each case have receiving spaces in this case for receiving the plastics material pre-forms as well as stressing devices, such as for example blow moulding nozzles, which expand the plastics material pre-forms to form the plastics material containers by acting upon them with blow moulding air. It is also possible, however, for the pre-forms between the heating apparatus 1 and the shaping device to pass through a further apparatus, such as for example a sterilization device, in which the pre-forms can be sterilized by being acted upon with a sterilization agent, such as for example hydrogen peroxide or peracetic acid.

Figure 2:
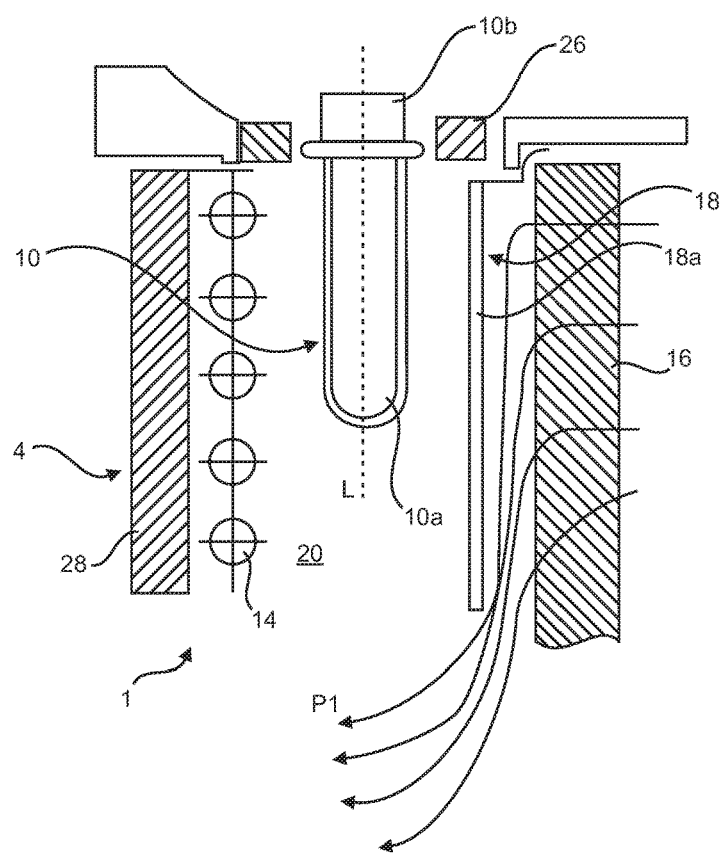
FIG. 2 is a view of an apparatus according to the invention.

FIG. 2 is a sectional illustration of the heating apparatus 1 in the direction of the conveying path T. In this case a plastics material pre-form 10 is again illustrated, which here is conveyed at a right angle to the plane of the figure. The reference number 10a designates a main body of the plastics material pre-form to be heated and the reference number 10b designates an aperture—which is not heated—of the plastics material pre-form. For this purpose, the apparatus has a screening device 26 which prevents the aforesaid aperture region 10b of the plastics material pre-form from also being excessively heated. The heating apparatus 1 has a heating element 4 which in this case has a plurality of warming elements 14 or heating radiators respectively. These heating radiators 14 likewise advantageously extend in this case along the conveying direction of the plastics material pre-forms 10.

The reference number 28 designates a back reflector which is used to direct the radiation of the radiation elements or heating elements 14 respectively also onto the plastics material pre-form 10. Instead of this or in addition to this, however, it would also be possible for the individual radiation elements 14 to have (individual) reflectors in each case which direct the radiation onto the plastics material pre-form. It would also be possible for reflectors of this type to be designed in such a way that a specific part of the radiation is directed again onto the radiation element 14 in order to heat it additionally. As shown in FIG. 2, radiation elements 14 are also provided in a region below the plastics material pre-form so that, in particular, a base region of the plastics material pre-form can also be heated efficiently. In addition, the individual radiation elements 14 are preferably capable of being switched on and off separately in order to permit for example a change-over to plastics material pre-forms 10 of different length in this way.

The reference number 16 designates a reflector element which is situated opposite the radiation elements 14 with respect to the conveying path of the plastics material pre-forms 10.

The reference number 18 designates roughly diagrammatically a flow guide element which, as mentioned above, can be introduced into the heating channel—designated 20 as a whole—for the plastics material pre-forms 10. As shown by the arrows P1, a gaseous medium, and in particular air, which is used for cooling the heating apparatus and/or also for cooling the thick-walled plastics material pre-forms 10, can be conveyed by this flow guide element 18 past the plastics material pre-forms 10. At the same time, however, a flow by which uniform temperature conditions can be maintained is produced in the heating channel 20.

If, however, the flow guide element 18 is removed from the heating channel, the gaseous medium can arrive directly at the outer surface of the plastics material pre-forms in order to cool the latter, as mentioned in the introduction. The removal of the flow guide element 18 is advantageous in particular when, as mentioned above, relatively thick-walled plastics material pre-forms are to be heated in the heating apparatus so as to be able to ensure a uniform heating through, without crystallization of the surface of the pre-forms being able to take place.

It is advantageous for the flow guide element 18 to be at least slightly longer in the longitudinal direction L of the plastics material pre-forms than the plastics material pre-forms themselves, so as to ensure that no gaseous medium will reach the outer surface of the plastics material pre-forms. In addition, it would also be possible for this flow guide element to have a lower curved portion (not shown) which is curved for example around the plastics material pre-forms. In this way, it would also be possible if necessary or if desired for the cooling air to be conveyed past the plastics material pre-forms transversely to the longitudinal direction thereof, without arriving in this case at the plastics material pre-forms.

Since the flow guide element or the intermediate plate respectively is used in particular in the case of thin-walled plastics material pre-forms and in the case of the latter a (more inexpensive) long-wave radiation is frequently sufficient to introduce the heat, the surface of the flow guide element which is facing the plastics material pre-forms is, as mentioned above, a very good reflector in the long-wave infrared light range. As a result, the flow guide element preferably differs from the reflector devices or respectively tiles used at present. In particular, the degree of reflection of this flow guide device should remain high for wavelengths of over 1250 mm. The reference 18a refers to a coating which is applied to the flow guide element 18 or to the main body thereof respectively and which has the reflection properties mentioned here.

In this case the flow guide element can have an assembly device (not shown), for example to be arranged on a housing of the heating channel.

The Applicants reserve the right to claim all the features disclosed in the application documents as being essential to the invention, insofar as they are novel either individually or in combination as compared with the prior art.

LIST OF REFERENCES 1 heating apparatus
2 conveying device
4 warming devices/heating element
10 plastics material pre-form
10a main body of the plastics material pre-form
10b aperture
14 warming elements/radiation elements
16 first reflector element
18 flow guide element
18a coating of the flow guide element
20 heating channel
22 reversing wheel
26 screening device
28 back reflector
32 supply device
34 separating apparatus/single-step star wheel
42 holding element
52 shaping station
56 transfer wheel
70 plant
P1 flow of the cooling air
T conveying path
L longitudinal direction

The invention claimed is:

1. An apparatus (1) for the heating of plastics material pre-forms (10) with a conveying device (2) which conveys the plastics material pre-forms (10) along a pre-set conveying path (T), with at least one heating element (4) which is arranged along the conveying path (T) of the plastics material pre-forms (10) and which heats the plastics material pre-forms (10), wherein in addition a cooling device is provided which cools the plastics material pre-forms (10) and/or at least one element of the apparatus (1) during the heating of the plastics material pre-forms (10) by acting upon them with a gaseous medium, wherein a flow path of the gaseous medium is capable of being changed in such a way that in a first pre-set manner it is capable of being conveyed with respect to the outer surface of the plastics material pre-forms (10) during the heating thereof and in a second pre-set manner, which differs from the first pre-set manner, it is capable of being conveyed with respect to the outer surface of the plastics material pre-forms (10), wherein the first and second pre-set manners differ at least with respect to the volume flow arriving at the outer surface of the plastics material pre-forms and wherein a change is possible in such a way that in at least one state the encounter of gas or air respectively with the outer surface of the plastics material pre-forms can be prevented completely and wherein the apparatus (1) has a flow guide element (18) for guiding the gas flow, and as a result of a relative movement of this flow guide element (18) with respect to the conveying path of the plastics material pre-forms (10) a change-over between the first pre-set manner and the second pre-set manner is possible and the flow guide element (18) has a hollow space which is open downwards in order to divert downwards the air flowing out of a reflector element (16), so that air also continues to flow through the apparatus for heating the plastic material pre-forms which results in constant conditions.

2. The apparatus (1) according to claim 1, wherein the apparatus has a heating channel (20) through which the plastics material pre-forms (10) are conveyed.

3. The apparatus (1) according to claim 1, wherein the apparatus has heating elements (14) which heat the plastics material pre-forms, and the flow guide element (18) is arranged in such a way that the plastics material pre-forms (10) are conveyed at least locally between the heating elements (14) and the flow guide element (18).

4. The apparatus (1) according to claim 1, wherein the apparatus (1) has a first reflector element (16) and the plastics material pre-forms (10) are conveyed between the heating elements (14) and the first reflector element (16).

5. The apparatus (1) according to claim 4, wherein the first reflector element (16) is cooled by the gaseous medium.

6. The apparatus (1) according to claim 1, wherein the flow guide element guides the cooling flow for the plastics material pre-forms (10) in at least one setting in a longitudinal direction (L).

7. The apparatus (1) according to claim 1, wherein the flow guide element is formed on at least one surface in such a way that it reflects infrared light with a wavelength of more than 900 nm by at least 20%, preferably by at least 40%, and preferably by at least 60%.

8. The apparatus according to claim 4, wherein the gaseous cooling medium passes through a cross-sectional area of the first reflector element (16).

9. A method of heating plastics material pre-forms (10) using the apparatus of claim 1, wherein the plastics material pre-forms are conveyed by a conveying device (2) along a pre-set conveying path (T) and are heated by at least one heating element (4) which is arranged along the conveying path (T) of the plastics material pre-forms (10), and in addition a cooling device is provided which cools the plastics material pre-forms (10) and/or at least one element of the apparatus (1) by acting upon them or it with a gaseous medium during the heating of plastics material pre-forms (10), wherein a flow path of the gaseous medium is changed in such a way that it is guided in a first pre-set manner with respect to the outer surface of the plastics material pre-forms (10) during the heating thereof and it is guided in a second pre-set manner—which is different from the first pre-set manner—with respect to the outer surface of the plastics material pre-forms (10), wherein the first pre-set manner and the second pre-set manner differ at least with respect to the volume flow which reaches the outer surface of the plastics material pre-forms (10).

10. An apparatus (1) for the heating of plastics material pre-forms (10) with a conveying device (2) which conveys the plastics material pre-forms (10) along a pre-set conveying path (T), with at least one heating element (4) which is arranged along the conveying path (T) of the plastics material pre-forms (10) and which heats the plastics material pre-forms (10), wherein in addition a cooling device is provided which cools the plastics material pre-forms (10) and/or at least one element of the apparatus (1) during the heating of the plastics material pre-forms (10) by acting upon them with a gaseous medium, wherein a flow path of the gaseous medium is capable of being changed in such a way that in a first pre-set manner it is capable of being conveyed with respect to the outer surface of the plastics material pre-forms (10) during the heating thereof and in a second pre-set manner, which differs from the first pre-set manner, it is capable of being conveyed with respect to the outer surface of the plastics material pre-forms (10), wherein the first and second pre-set manners differ at least with respect to the volume flow arriving at the outer surface of the plastics material pre-forms and wherein the apparatus (1) has a flow guide element (18) for guiding the gas flow which is arranged in front of a reflector element (16) and the plastics material pre-forms are guided between the heating elements (4) and the guiding element (18) and wherein the apparatus (1) has a flow guide element (18) for guiding the gas flow, and as a result of a relative movement of this flow guide element (18) with respect to the conveying path of the plastics material pre-forms (10) a change-over between the first pre-set manner and the second pre-set manner is possible and the flow guide element (18) has a hollow space which is open downwards in order to divert downwards the air flowing out of a reflector element (16), so that air also continues to flow through the apparatus for heating the plastic material pre-forms which results in constant conditions.

11. The apparatus (1) according to claim 1, wherein the guide element (18) is designed in the form of a screening plate.

12. The apparatus (1) according to claim 1, wherein the guide element (18) extends over the entire heating module in the conveying direction of the plastics material pre-forms.

13. The apparatus (1) according to claim 1, wherein the apparatus (1) has a screening element (26) in order to screen off a thread area of the plastics material pre-forms during the heating.

* * * * *